United States Patent

Brunetto

[11] Patent Number: 5,914,169
[45] Date of Patent: Jun. 22, 1999

[54] PROTECTIVE COVER FOR VEHICLE FLOOR MAT

[76] Inventor: Joseph J. Brunetto, 24 Overlook Rd., Dobbs Ferry, N.Y. 10522

[21] Appl. No.: 08/879,435

[22] Filed: Jun. 20, 1997

[51] Int. Cl.[6] ...................................................... B32B 3/06
[52] U.S. Cl. ..................................... 428/99; 5/417; 5/495; 5/496; 5/497; 15/215; 15/216; 15/217; 428/68; 428/95; 428/192; D12/203
[58] Field of Search ................................ 428/99, 192, 68, 428/95; 15/215, 216, 217; 5/417, 496, 497, 495; D12/203

[56] References Cited

U.S. PATENT DOCUMENTS

| | | | |
|---|---|---|---|
| 2,919,456 | 1/1960 | Spivey | 15/215 |
| 3,663,980 | 5/1972 | Conklin | 15/215 |
| 4,686,721 | 8/1987 | Hubert | 5/495 |
| 4,876,135 | 10/1989 | McIntosh | 428/74 |
| 5,028,468 | 7/1991 | Taylor | 428/71 |
| 5,236,753 | 8/1993 | Gaggero et al. | 428/43 |
| 5,316,817 | 5/1994 | Timperley | 428/78 |
| 5,358,768 | 10/1994 | Wiley, III | 428/95 |

*Primary Examiner*—Nasser Ahmad
*Attorney, Agent, or Firm*—Lackenbach Siegel Marzullo Aronson & Greenspan, P.C.

[57] ABSTRACT

A protective cover for a motor vehicle conventional floor mat comprising a removable fabric protectively enclosing the top side of the mat. An elastic strip integral with the inner rim of the cover removably engages the cover to the underside of the floor mat. The conventional floor mat has a mat irregular peripheral edge and the cover edge is custom fitted to the mat irregular peripheral edge. An elastic strip unitary with the cover inner rim allows the cover to be disengaged from the floor mat by stretching the elastic strip to a biased mode. The cover is preferably made of an uncut pile fabric such as terry cloth. A waterproofing layer is preferably attached to the interior surface of the cover.

6 Claims, 1 Drawing Sheet

PROTECTIVE COVER FOR VEHICLE FLOOR MAT

FIELD OF THE INVENTION

This invention relates to the field of car floor mats and more particularly to protective covers for car floor mats.

BACKGROUND OF THE INVENTION

Pairs of flexible, waterproof floor mats are designed and fabricated by car manufacturers for each model of car. Car floor mats are intended to protect the floor carpeting of the vehicle from staining, discoloration, or adhering materials such as tar, oil, gum, and various foods. The floor mat itself, however, is commonly contaminated with material that is unsightly and cannot be completely removed such as gum, oil, or tar, or with substances that create odors that cannot be totally eliminated, such as those made by spilled substances or pets, so that the interior of the car becomes unsightly or unpleasant. In such a case, the user of the vehicle often prefers to discard such a contaminated mat. Car manufacturers usually offer replacement mats custom made for designated models, often in pairs. The cost, although not high, is yet not inexpensive. Non-custom made vehicle floor mats are available, but these mats also can be somewhat costly.

Conventional car floor mats vary in configuration in accordance with vehicle models, but it can be said that all car floor mats are somewhat irregular in configuration. Also, custom mats have variously dimensioned outer edges that fit around variously positioned vehicle mechanisms. These edges can be rectangular or curvilinear in configuration.

Replaceable covers for floor mats in general are known in the art. One such cover is described in U.S. Pat. No. 3,663,980, issued May 23, 1972 to Conklin. This patent discloses a soft fabric cover that encloses the top side of a door mat and also removably secured to the underside of the mat by a hook fabric fastener strip engaged by a strip of matted fabric attached to the underside of the door mat.

SUMMARY OF THE INVENTION

One object of the present invention is to provide an easily removable, cleanable, and reusable protective cover for a floor mat of a motor vehicle.

Another object of the present invention is to provide a protective cover for a motor vehicle conventional floor mat comprising a removable fabric protectively enclosing the top side of the mat. An elastic strip integral with the inner rim of the cover removably engages the cover to the underside of the floor mat. The conventional floor mat has a mat irregular peripheral edge and the cover edge is custom fitted to the mat irregular peripheral edge. An elastic strip unitary with the cover inner rim allows the cover to be disengaged from the floor mat by stretching the elastic strip to a biased mode. The cover is preferably made of an uncut pile fabric such as terry cloth. A waterproofing layer is preferably attached to the interior surface of the cover.

Another object of the present invention is to provide a protective cover for a standard vehicle floor mat that can be easily secured to the floor mat and easily disengaged from the floor mat and thereupon washed and then easily remounted to the floor mat.

Yet another object of the present invention is to provide a custom fit cover for a conventional floor mat of a vehicle that conforms to the peripheral configuration of the floor mat and that can be engaged to the floor mat and easily removed and cleaned and resecured to the floor mat.

In accordance with these and other objects that will become apparent in the course of this disclosure, there is provided Other embodiments or modifications may be suggested to those having the benefit of the teachings therein, and such other embodiments or modifications are intended to be reserved especially as they fall within the scope and spirit of the subjoined claims.

DESCRIPTION OF THE PREFERRED EMBODIMENT

Figure 1:
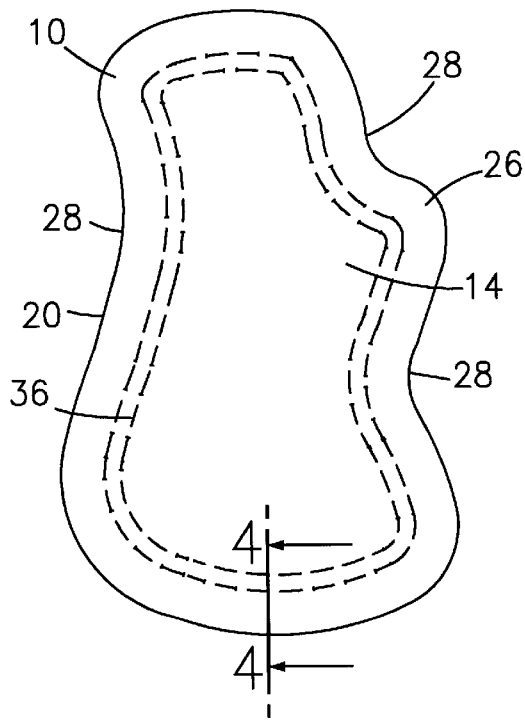
FIG. 1 is a top view of the inventive protective cover enclosing a floor mat of a motor vehicle.

Reference is now made in detail to the drawings wherein the same numerals refer to the same or similar elements throughout.

A removable protective cover 10 for a conventional floor mat 12 for a motor vehicle is shown in FIGS. 1, 2, 3, 4, and 5. Cover 10 includes a cover top side 14 that covers and protects mat top side 16. In addition cover 10 includes a cover side edge 20 that is custom fitted to peripheral edge 18 of mat 12. Also, cover 10 includes a cover bottom side 22 that extends across a portion of mat underside 24.

Figure 2:
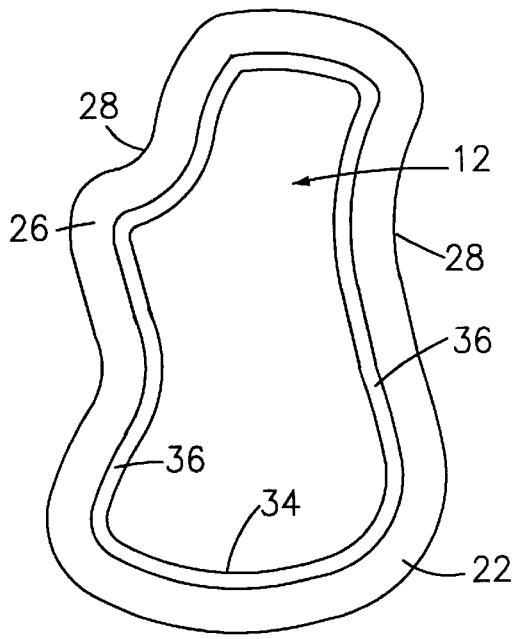
FIG. 2 is a bottom view of the cover with floor mat shown in FIG. 1.

Mat peripheral edge 18 is shown as irregular in configuration with curved convex edge areas 26 and curved concave edge areas 28 for purposes of exposition. Floor mat 12 as illustrated in FIGS. 1 and 2 does not represent a particular type of vehicle floor mat but rather is an illustrative composite of many types of conventional vehicle floor mats. Such conventional floor mats are configured to accommodate a broad spectrum of vehicle manufacturers and models. In fact, many vehicle floor mats do not have curved areas but often are in fact linear in configuration. In addition, mat underside 24 includes a flat bottom surface 30 with regularly positioned downwardly extending nipple projections 32 that are common in standard vehicle floor mats for purposes of spacing mat bottom surface 30 from a wet vehicle floor. It is to be understood that nipple projections 32 may not always be present in conventional floor mats and are described herein merely to emphasize that the present invention relates to all types of conventional vehicle floor mats.

Figure 5:
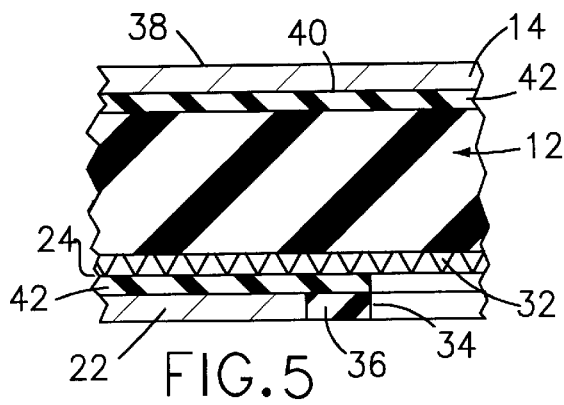
FIG. 5 is an enlarged view of a portion of the view shown in FIG. 4 that includes the woven elastic at the periphery of the cover.

Cover bottom side 22 lies across an outer area of mat underside 24 and includes a cover inner rim 34 that is in snug relationship with mat peripheral edge 18. As best seen in FIGS. 2 and 5, cover inner rim 34 includes a generally oblong continuous biasable strip 36 that is integral with cover 10 along cover inner rim 34. Cover inner rim 34 in general maintains a minimum and predetermined distance from mat peripheral edge 18 sufficient to secure cover 10 to floor mat 12. Cover 10 is removably secured to floor mat 12 by action of biasable strip 36 in the unbiased mode. Cover 10 can be disengaged from floor mat 12 by the user forcing biasable strip 36 from the unbiased mode outwardly to a biased mode so that cover inner rim 34 is stretched to an enlarged distance sufficient to pass cover inner rim 34 beyond mat peripheral edge 18 thus allowing the removal of the entirety of cover 10 from floor mat 12.

Cover 10 is flexible and made of a fabric that is capable of absorbing moisture and holding dirt and other materials. Such fabric is preferably a piled, uncut, looped fabric material, known as terry or terry cloth. Other materials that have equivalent protective or absorbent characteristics can be used. Cover 10 can be washed and dried as is possible with any terry cloth towel and then remounted to floor mat 12. Biasable strip 36 is made of an elastic that is interwoven into integral and unitary union with cover 10.

Figure 4:
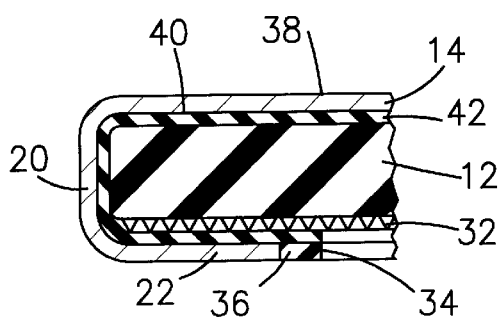
FIG. 4 is a sectional view taken through line 4—4 in FIG. 1 with the cover including an inner layer of waterproofing material affixed to the cover.
Figure 3:
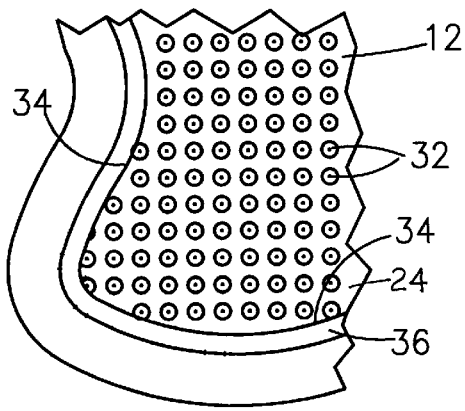
FIG. 3 is an enlarged view of the lower left hand portion of the cover and floor mat shown in FIG. 2.
Figure 6:
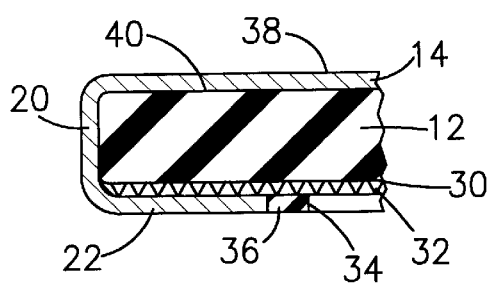
FIG. 6 is a view analogous to the view shown in FIG. 4 but without the layer of waterproofing material.

Cover 10 includes an exterior surface 38 that is the actual piled fabric of cover 10. Cover 10 also includes an interior surface 40 opposite to exterior surface 38. Interior surface 40 can be an untreated surface, such as is illustrated in FIG. 6. Interior surface 40 can also be covered with a water-proofing layer 42 as illustrated in FIG. 4. In addition, cover interior surface 40 can be treated with a water-proofing agent that becomes integral with interior surface 40 that performs the same function as water-proofing layer 42.

FIGS. 2, 3, 4 and 5, floor mat 12 illustrate the plurality of regularly spaced downwardly extending nipple projections 32 that are unitary with mat bottom surface 30. Nipple projections 32 are in direct contact with the floor of the motor vehicle. In FIG. 4 water-proofing layer 42 along cover bottom side 22 is in contact with a portion of the plurality of nipple projections 32. In FIG. 6, cover interior surface 40 is in contact with a portion of the plurality of nipple projections 32.

Cover convex portion 26 and cover concave portion 28 are positioned at predetermined minumum distances from the mat irregular peripheral edge 18 so that cover 10 is maintained in a mounted relationship to floor mat 12.

Although the present invention has been described in some detail by way of illustration and example for purposes of clarity and understanding, it will, of course, be understood that various changes and modifications may be made in the form, details, and arrangements of the parts without departing from the scope of the invention as set forth in the following claims.

What is claimed is:

1. A removable/washable, absorbent cloth material protective cover in combination with for a motor vehicle conventional floor mat, comprising: cover means in the form of a flexible cover made of a pile fabric that completely and protectively encloses for protectively enclosing the top side of the floor mat; securing means integral with said cover for removably engaging removable engages said cover to the floor mat; said floor mat having an underside, and an irregular peripheral edge, and said cover further having a cover top side enclosing the floor mat's top side and a cover side edge enclosing and conforming with said irregular peripheral edge; and said cover including a cover inner rim and a cover bottom side enclosing a portion of the floor mat's underside, and said securing means being a woven biasable/elastic continuous fabric strip unitary with said cover at said cover inner rim; and said biasable/elastic strip being biasable between biasable and unbiased modes, wherein in the unbiased mode said biasable/elastic strip engages and holds said cover to the floor mat and in the biased mode when stretched, the cover is disengagable from the floor mat.

2. The cover combination of claim 1, wherein said pile fabric is an uncut pile fabric.

3. The cover combination of claim 2, wherein said uncut pile fabric is terry cloth.

4. The cover combination of claim 1, wherein said flexible cover includes a cover exterior surface and a cover interior surface, and further including a waterproofing layer attached to said cover interior surface.

5. The cover combination of claim 1, wherein the mat irregular peripheral edge further including mat convex and concave portions, and said cover side edge includes cover convex and concave portions that conform with the mat convex and concave portions.

6. The cover combination of claim 5, wherein said cover concave and cover convex portions are positioned at predetermined minumum distances from the mat irregular peripheral edge, wherein said cover is maintained in a mounted relationship to the floor mat.

\* \* \* \* \*